US005734397A

United States Patent [19]

Maeda

[11] Patent Number: 5,734,397

[45] Date of Patent: Mar. 31, 1998

[54] IMAGE FORMING APPARATUS

[75] Inventor: Masataka Maeda, Konan, Japan

[73] Assignee: Brother Kogyo Kabushiki Kaisha, Nagoya, Japan

[21] Appl. No.: 524,502

[22] Filed: Sep. 7, 1995

[30] Foreign Application Priority Data

Sep. 29, 1994 [JP] Japan ........................ 6-234756

[51] Int. Cl.[6] ........................ G01D 15/06

[52] U.S. Cl. ........................ 347/55; 347/147

[58] Field of Search ........................ 347/55, 147, 151

[56] References Cited

U.S. PATENT DOCUMENTS 3,689,935 9/1972 Pressman et al. .
5,036,341 7/1991 Larsson .
5,128,695 7/1992 Maeda ........................ 346/140 R
5,138,346 8/1992 Muto ........................ 346/155
5,504,509 4/1996 Kagayama ........................ 347/55
5,576,742 11/1996 Abe ........................ 347/55

FOREIGN PATENT DOCUMENTS 0 587 366 A1 3/1994 European Pat. Off. .

*Primary Examiner*—Daniel P. Malley
*Attorney, Agent, or Firm*—Oliff & Berridge, P.L.C.

[57] ABSTRACT

An edge electrode member includes an insulating sheet preferably made of polyamide, a number of control electrodes and a control voltage applying circuit provided on the insulating sheet. The control electrodes are formed independently of each other at a recording edge portion of the edge electrode member. The recording edge portion member is disposed upstream of the recording position so that the direction of an electric field coincides with the transport direction of the support member when control of flows of toner powder is changed. The image forming apparatus can output an image of a high picture quality free from toner powder trailing.

12 Claims, 6 Drawing Sheets

IMAGE FORMING APPARATUS

BACKGROUND OF THE INVENTION

1. Field of the Invention

This invention relates to an image forming apparatus that can be applied to a copying machine, a printer, a plotter, a facsimile or a similar apparatus.

2. Description of the Related Art

Conventionally, various image forming apparatus having been proposed in which an aperture electrode member having a plurality of openings (hereafter apertures) are used to form an image. In such an image forming apparatus, a voltage is selectively applied to the aperture electrode member based on image data to control toner particles that selectively pass through the apertures. An image is formed on a support member based on the toner particles that selectively pass through the apertures of the aperture electrode member. For example, one of such image forming apparatus is disclosed in U.S. Pat. No. 3,689,935, the subject matter of which is incorporated herein by reference.

The above-described image forming apparatus includes an aperture electrode member, a voltage supply device, a toner supply device and a positioning device.

The aperture electrode member is formed from a flat plate made of an insulating material, a reference electrode, a plurality of control electrodes and a plurality of apertures. The reference electrode is continuously formed on one face of the flat plate. The control electrodes are formed on the other face of the flat plate such that they are isolated from each other. The apertures are formed for the individual control electrodes at least in one row along a longitudinal direction of the aperture electrode member and extend through the flat plate, the reference electrode and the control electrodes.

The voltage supply device selectively supplies a voltage between the reference electrode and the control electrodes of the aperture electrode member based on image data. The toner supply device supplies charged toner particles to a location below the aperture electrode member so that toner particles passing through the apertures may be modulated based on the potential applied to the aperture electrode member. The positioning device transports and positions a support member on which an image is to be formed for movement relative to the aperture electrode member in flow paths of toner particles.

Another image forming apparatus has been proposed in U.S. Pat. No. 5,036,341 (JP-A-1-503221), the subject matter of which is incorporated herein by reference, wherein passage of toner powder is controlled by a grating-formed electrode matrix to obtain an image on a support member.

However, the above-described apparatus have a problem in that the apertures or the grating-formed openings choke up with toner particles. This results in deterioration of the recording quality and recording speed.

The applicant of the present invention has proposed an image forming apparatus wherein (as disclosed in European Unexamined Publication No. 587,366 (P-A-6-155798)), a carrying member carries toner powder thereon and a toner flow controlling member such as an aperture electrode member is disposed in contact with each other so that the recording characteristics can be greatly improved. Thus, choking up of the apertures of the aperture electrode member with toner powder is remarkably reduced. Consequently, the picture quality is greatly improved and the image forming apparatus can be reduced in size and cost.

With this image forming apparatus choking is not completely eliminated since the aperture electrode member is still employed as an electrode for controlling toner powder flows. Accordingly, the image forming apparatus has a problem in that, although it may occur very seldom, the apertures are choked up with toner powder. This results in deterioration of the picture quality.

SUMMARY OF THE INVENTION

It is an object of the present invention to provide an image forming apparatus that does not suffer from choking with toner powder and can output an image of a very high picture quality.

It is another object to provide an image forming apparatus where an image of a high picture quality can be output free from toner powder trailing.

This invention therefore provides an image forming apparatus including an edge electrode member having a recording edge portion disposed in the proximity of a recording position at which a toner image can be formed on a support member. The recording edge position is at an end portion of the edge electrode member to control toner powder flow. The apparatus also includes a toner supply device for supplying charged toner powder to the edge electrode member, a back electrode disposed in an opposing relationship to the toner supply device with the edge electrode member interposed therebetween and a transport device transporting the support member in a predetermined direction.

The toner supply device may include a toner carrying roller. The recording edge portion is disposed substantially in the proximity of a top portion of the toner carrying roller.

The recording edge portion may be disposed upstream for the recording position in the direction in which the support member is transported by the transport device.

The edge electrode member preferably includes an insulating sheet and a plurality of control electrodes provided on one face of the recording edge portion independent of each other. The recording edge portion is disposed upstream of the recording position in the direction in which the support member is transported.

The toner supply device supplies charged toner powder to the edge electrode member having the recording edge portion disposed in the proximity of the recording position at which a toner image can be formed on a support member. Since the edge electrode member has no apertures, the toner powder does not choke as in the prior art. The transport device transports the support member on which a toner image is to be formed in the predetermined direction. Since the recording edge portion of the edge electrode member is disposed upstream of the recording position in the direction in which the support member is transported by the transport device, an electric field extending from the recording edge portion toward the back electrode has an electrostatic force in the advancing direction of the support member. Consequently, immediately after a voltage of the same polarity as the charging polarity of the toner powder is applied to the control electrodes, toner powder present between the control electrodes and the back electrodes is acted upon and thus flown by the electrostatic force also in the advancing direction of the support member. Consequently, the trailing of picture elements on the support member is reduced.

When the toner supply device includes the toner carrying roller and the recording edge portion is disposed substantially in the proximity of a top portion of the toner carrying roller, toner powder is effectively controlled by the intense electric field formed between the edge electrode member and the toner carrying roller.

When the edge electrode member includes an insulating sheet and a plurality of control electrodes provided on one face of the recording edge portion independent of each other and the recording edge portion is disposed upstream of the recording position, an electric field is formed between the control electrodes and the back electrode having an electrostatic force in the advancing direction of the support member. Consequently, immediately after a voltage of the same polarity as the charging polarity of the toner powder is applied to the control electrodes, toner powder present between the control electrodes and the back electrode is acted upon and flown by the electrostatic force also in the advancing direction of the support member. Consequently, the trailing of picture elements on the support member is reduced.

Accordingly, since toner powder flying between the control electrodes and the support member flies in such a manner as to follow the advancement of the support member immediately after the voltage supplied to the control electrodes is changed over from an on voltage to an off voltage, an image of a high picture quality free from trailing of toner powder is formed.

Other objects, advantages and salient features of the invention will become apparent from the following detailed description taken in conjunction with the annexed drawings, which disclose preferred embodiments of the invention.

BRIEF DESCRIPTION OF THE DRAWINGS

A preferred embodiment of the present invention will be described in detail with reference to the following Figures in which the reference numerals refer to like elements and wherein.

DETAILED DESCRIPTION OF PREFERRED EMBODIMENTS

Figure 1:
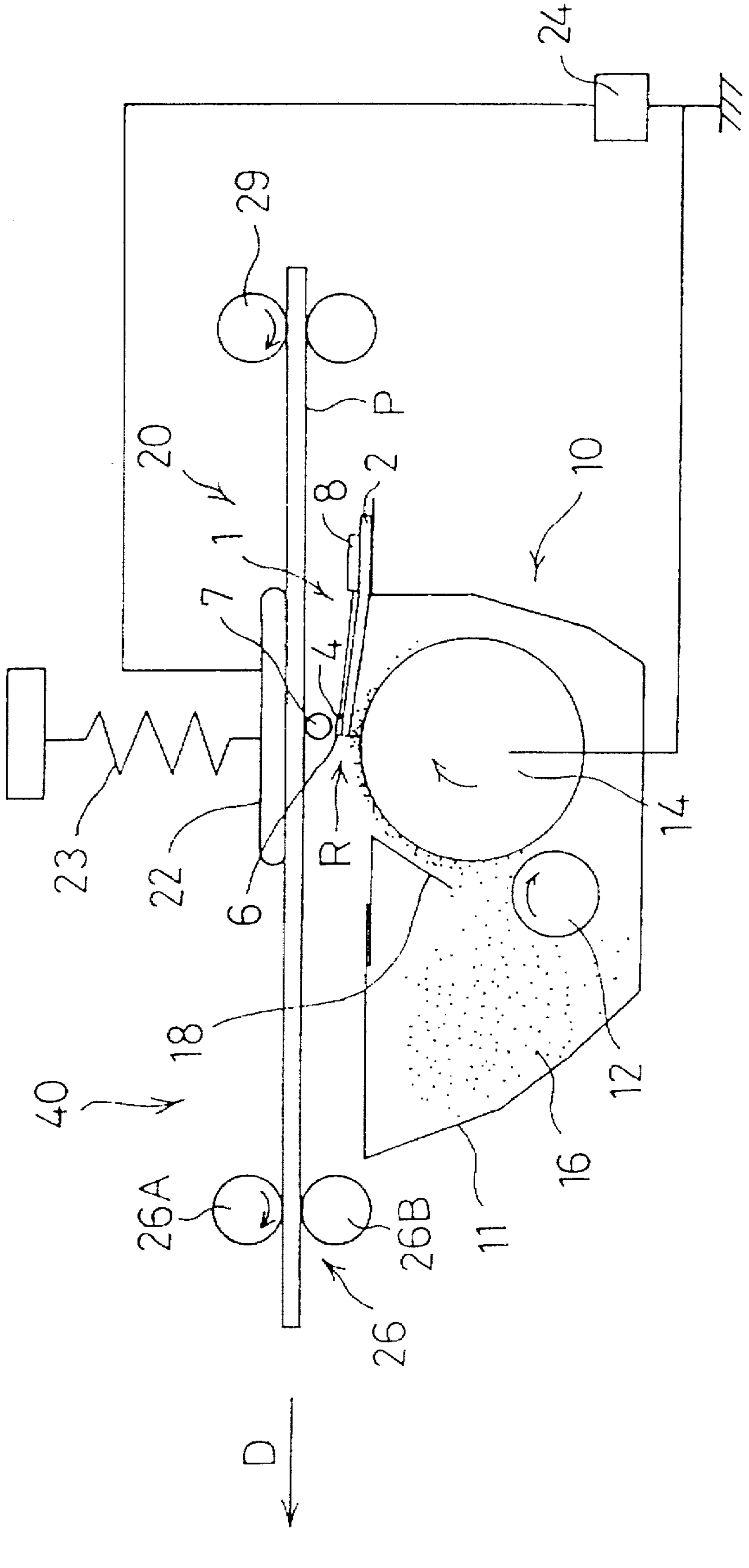
FIG. 1 is a schematic view showing principal components of the image forming apparatus.

Preferred embodiments of the present invention will be described with reference ho the drawings. A general construction of principal components of the image forming apparatus according to the present invention will be described with reference to FIGS. 1 and 2.

The image forming apparatus includes a toner supply station 10, a toner control station 20 and a support member transport station 40.

The toner supply station 10 includes a toner case 11 serving also as a housing of the toner supply station 10, toner powder 16 accommodated in the toner case 11, a supply roller 12, a toner carrying roller 14 and a toner layer regulating blade 18.

The supply roller 12 rotates in the toner case 11 in the direction indicated by the arrow. The supply roller 12 frictionally contacts with toner powder 16 in the toner case 11 to negatively charge the toner powder 16 and press the toner powder 16 against the surface of the supply roller 12.

The toner carrying roller 14 rotates in the toner case 11 in the direction indicated by the arrow. The toner carrying roller 14 is disposed in contact with and in parallel to the supply roller 12. Accordingly, the toner carrying roller 14 frictionally contacts with the charged toner powder 16 attracted to the surface of the supply roller 12 so that the toner carrying roller 14 further negatively charges the toner powder 16. Then, the toner carrying roller 14 attracts the toner powder 16 charged negatively to the surface of the roller 14 and thus carries the toner powder 16 to transport the toner powder 16 to a recording edge portion 6 of an edge electrode member 1. The toner carrying roller 14 is generally grounded.

The toner layer regulating blade 18 is disposed in pressure contact with a circumferential face of the toner carrying roller 14 to adjust the amount of toner powder 16 carried on the surface of the toner carrying roller 14 so the toner powder 16 lies uniformly on the surface of the toner carrying roller 14 and remains uniformly charged.

The toner control station 20 includes an edge electrode member 1 to control toner powder flow, a control voltage applying circuit 8, a back electrode 22 and a DC power source 24.

Figure 2:
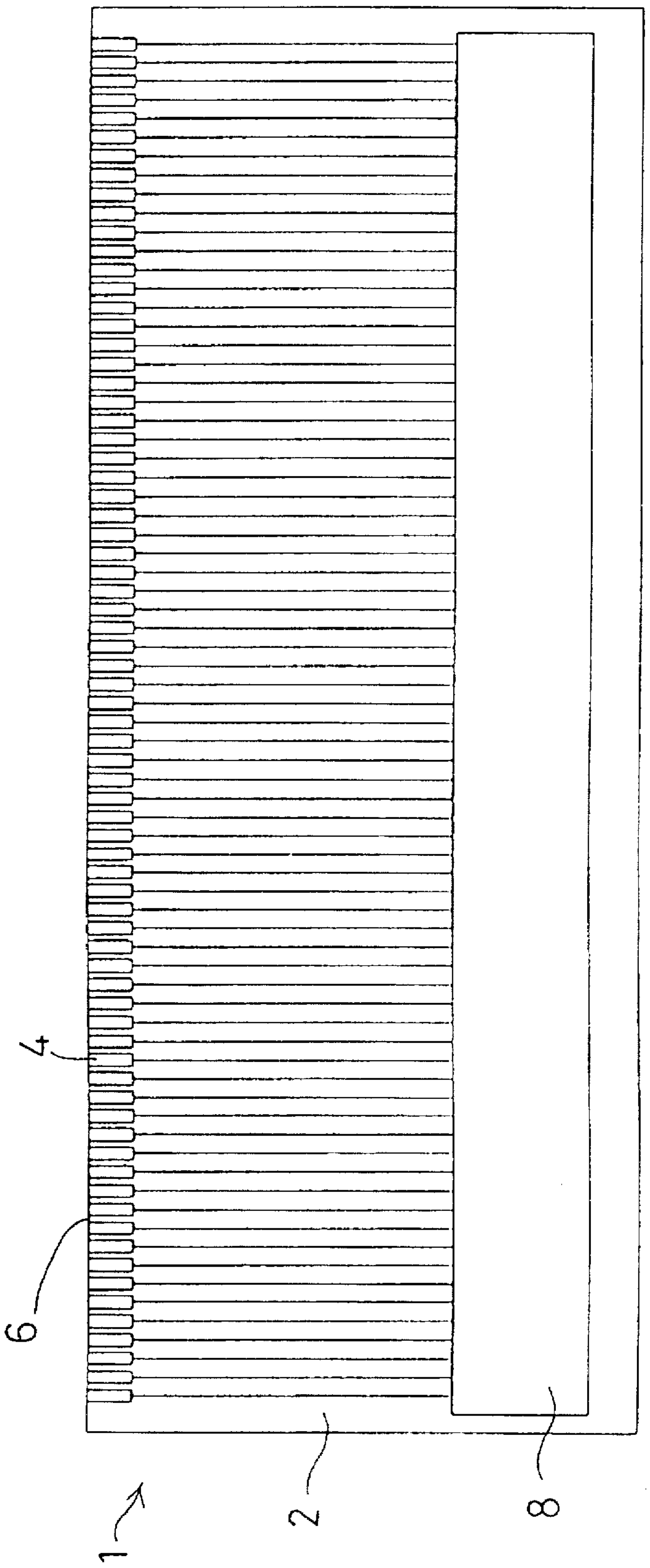
FIG. 2 is a top plan view showing an edge electrode member.

The edge electrode member 1 has a plurality of control electrodes 4 and a control voltage applying circuit 8 formed on an insulating sheet 2 preferably 25 μm thick made of polyimide as shown in FIG. 2. The edge electrode member 1 has an elongated shape. The large number of control electrodes 4 are disposed independently of each other at an end portion of one face of the edge electrode member 1. The end portion forms the recording edge portion 6. The control electrodes 4 oppose a support member P being transported.

Each of the control electrodes 4 has a substantially rectangular shape preferably 100 μm wide, 400 μm long and 1 μm thick. The large number of control electrodes 4 are formed independently of each other at intervals of preferably 125 μm and extend from the recording edge portion 6. The recording edge portion 6 is disposed in proximity to a recording position R at which it can record a toner image on the support member P. The edge electrode member 1 is upstream in a transporting direction D of the recording position R of the support member P as shown in FIG. 1. The recording edge portion 6 is disposed substantially in the proximity of the top of the toner carrying roller 14 upstream of the recording position R in the transporting direction D of the support member P.

A holding member 7 preferably of 0.5 mm thick is fixedly disposed above the edge electrode member 1. Accordingly, when the support member P is transported into a gap between the back electrode 22 and the holding member 7. The distance between the support member P and the edge electrode member 1 is kept to preferably 0.5 mm by the holding member 7. Thus, the edge electrode member 1 can be pressed using the holding member 7 and the support member P by a compression spring 23 connected to the back electrode 22. Accordingly, the insulating sheet 2 of the edge electrode member 1 lightly contacts the recording edge portion 6 with the toner layer on the toner carrying roller 14.

The control electrodes 4 are connected independently of each other to the control voltage applying circuit 8 as shown in FIG. 2. The control voltage applying circuit 8 is disposed on the face of the edge electrode member 1 on which the control electrodes 4 are disposed to selectively apply a voltage of preferably +20 V or −20 V to each of the control electrodes 4 based on an image signal.

The DC power source 24 is connected between the back electrode 22 and the toner carrying roller 14 so it can apply a voltage of preferably +1 kV to the back electrode 22. Thus, the charged toner powder 16 is controlled by an electric field formed by the large number of control electrodes 4 provided on the recording edge portion 6 of the edge electrode member 1, the toner carrying roller 14 and the back electrode 22.

A manner in which the charge toner powder 16 is controlled by the control electrodes 4, the control voltage applying circuit 8, the toner carrying roller 14 and the back electrode 22 will be described below.

Figure 3A:
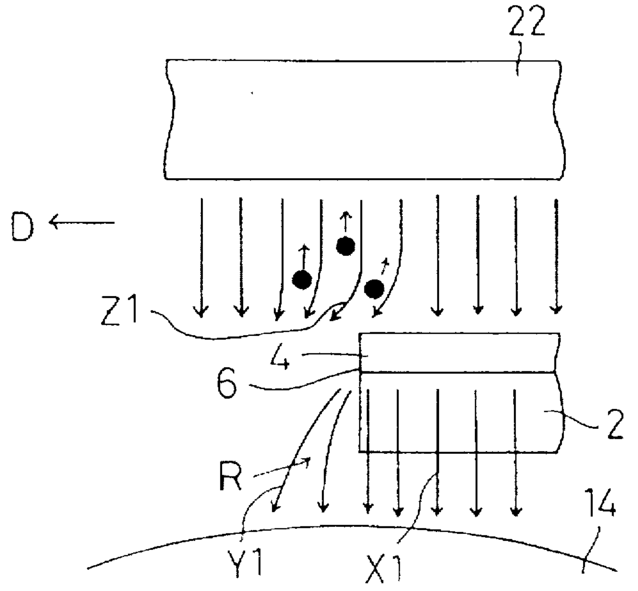
FIG. 3A is a diagrammatic view illustrating electric lines of force for toner powder when the voltage to be applied to a control electrode is changed to an on voltage.
Figure 4:
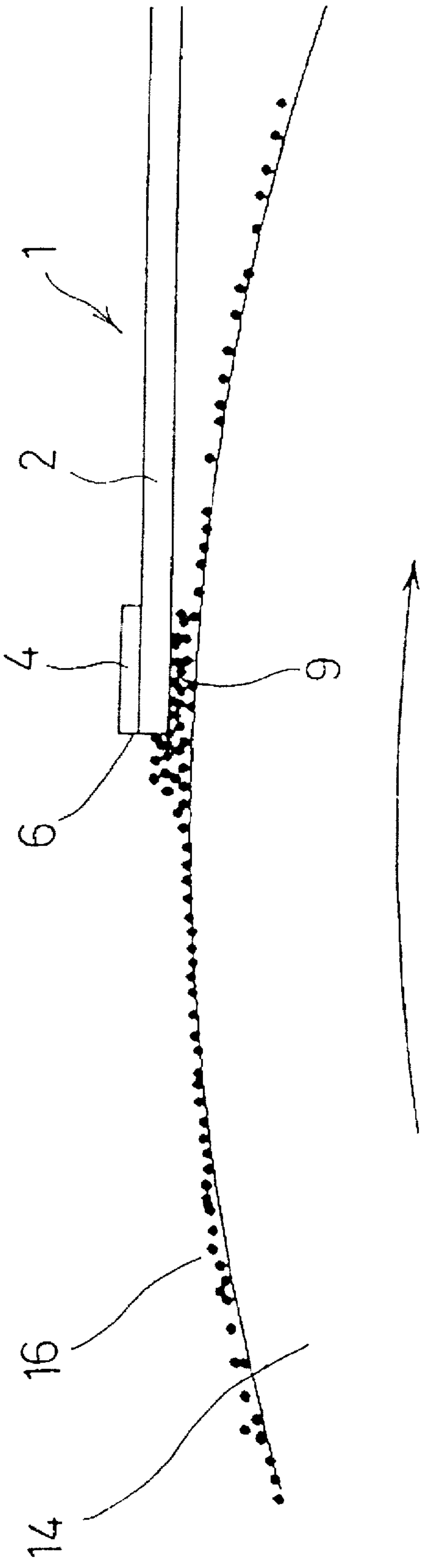
FIG. 4 is an enlarged view showing the recording edge portion of the edge electrode member.

When an image signal is input to the image forming apparatus, the voltage of preferably +20 V (on voltage) is selectively applied from the control voltage applying circuit 8 to the control electrodes 4 that correspond to an image portion (picture elements at which toner power is to adhere) based on the image signal. As a result, electric lines of force X1 are formed in the proximity of the recording edge portion 6 as well as on the rear faces of the control electrodes 4 due to a potential difference between the control electrodes 4 (+20 V) and the toner carrying roller 14 (0 V) such that they extend from the control electrodes 4 to the toner carrying roller 14 as seen in FIG. 3A. Consequently, the negatively charged toner powder 16 present on the rear faces or substantially downwardly of the control electrodes 4 are acted upon by electrostatic forces toward the higher potential. As a result, the toner powder 16 is adhered to and accumulated on rear face portions 9 of the control electrodes 4 as shown in FIG. 4. Consequently, transportation of the toner powder 16 on the toner carrying roller 14 is delayed so that the toner powder 16 is collected below the recording edge portion 6. The toner powder 16 collected below the recording edge portion 6 passes in the proximity of the recording edge portion 6 and is drawn out to the control electrodes 4 by an electric field formed between the substantial top portion of the toner carrying roller 14 below the recording edge portion 6 and the control electrodes 4.

Further, electric lines of force Z1 are formed by the voltage of +1 kV applied to the back electrode 22 such that they extend from the back electrode 22 to the control electrodes 4. Accordingly, the toner powder 16 drawn out to the control electrodes 4 is acted upon by an electrostatic force toward the back electrode 22. Consequently, the toner powder 16 flies toward the support member P transported below the back electrode 22 to accumulate on the support member P and form picture elements.

Figure 3B:
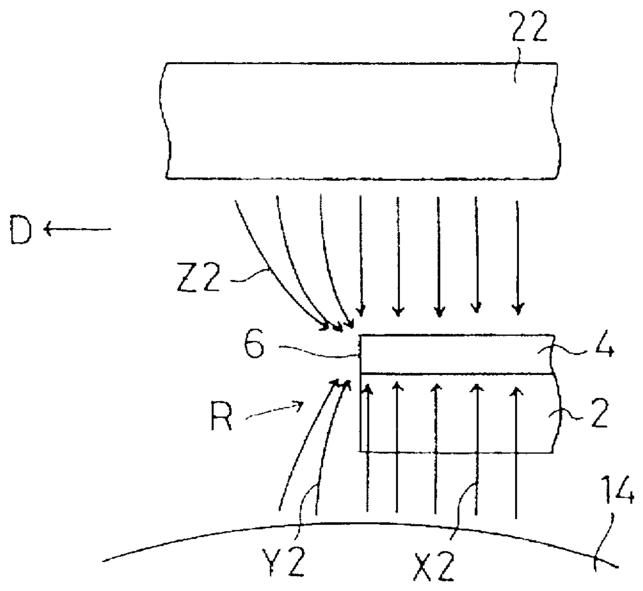
FIG. 3B is a similar view illustrating electric lines of force for toner powder when the voltage to be applied to the control electrode is changed to an off voltage.

Meanwhile, the voltage of −20 V (off voltage) is applied from the control voltage applying circuit 8 to the control electrodes 4 corresponding to a non-image portion (picture elements at which no toner powder is to adhere). As a result, electric lines of force X2 and Y2 are formed between the toner carrying roller 14 (0 V) and the control electrodes 4 (−20 V) as shown in FIG. 3B. Electric lines of force Z2 are formed between the back electrode 22 (+1 kV) and the control electrodes 4 (−20 V). As a result, the toner powder 16 on the toner carrying roller 14 is acted upon by an electrostatic force in a direction pressed against the toner carrying roller 14. Thus, the toner powder 16 passes by the rear face portions 9 of the edge electrode member 1 without adhering to the rear face portions 9 of the control electrodes 4. The toner power 16 is thus transported toward the supply roller 12 without staying at the recording edge portion 6. As a result, the toner powder 16 will not be drawn out to the control electrodes 4 side since it does not pass in the proximity of the recording edge portion 6.

The support member transport station 40 includes a pair of transport rollers 29 and a fixing apparatus 26. The support member P is inserted through an insertion opening (not shown), held between the pair of transport rollers 29 and is transported in the direction of the arrow mark D toward the fixing apparatus 26 past a location below the back electrode 22 at the recording position R. The fixing apparatus 26 includes a heat roller 26A having a heat source in the inside and a pressure contact roller 26B held in contact with the heat roller 26A. The support member P on which an image has been formed is held between the two rollers 26A and 26B. The toner image is fixed to the support member P by heat. Thereafter, the support member P is discharged to the outside of the image forming apparatus through a discharging opening (not shown).

When an instruction to form an image is input to the image forming apparatus, the toner carrying roller 14 and the supply roller 12 individually start rotation in the directions indicated by the arrow marks shown in FIG. 1. Consequently, toner powder 16 transported from the supply roller 12 is rubbed against the surface of the toner carrying roller 14 and is negatively charged so it is carried onto the surface of the toner carrying roller 14. The toner powder 16 carried on the toner carrying roller 14 is leveled into a thin layer and is uniformly charged by the toner layer regulating blade 18. The toner powder 16 is then transported toward the recording edge portion 6 as the toner carrying roller 14 further rotates. Then, the toner powder 16 on the toner carrying roller 14 is supplied to the location below the recording edge portion 6.

Consequently, the voltage of +20 V (on voltage) is selectively applied from the control voltage applying circuit 8 to the control electrodes 4 that correspond to an image portion (picture elements at which toner power is to adhere) based on an input signal input to the image forming apparatus while the voltage of −20 V (off voltage) is selectively applied from the control voltage applying circuit 8 to the control electrodes 4 that correspond to a non-image portion (picture elements at which no toner powder is to adhere).

In this instance, the off voltage is applied to a control electrode 4 to which the on voltage is applied, (i.e., the picture element to be formed by a control electrode 4 which is forming a picture element to which toner powder is adhered is a picture element to which no toner powder is to adhere).

Figure 5:
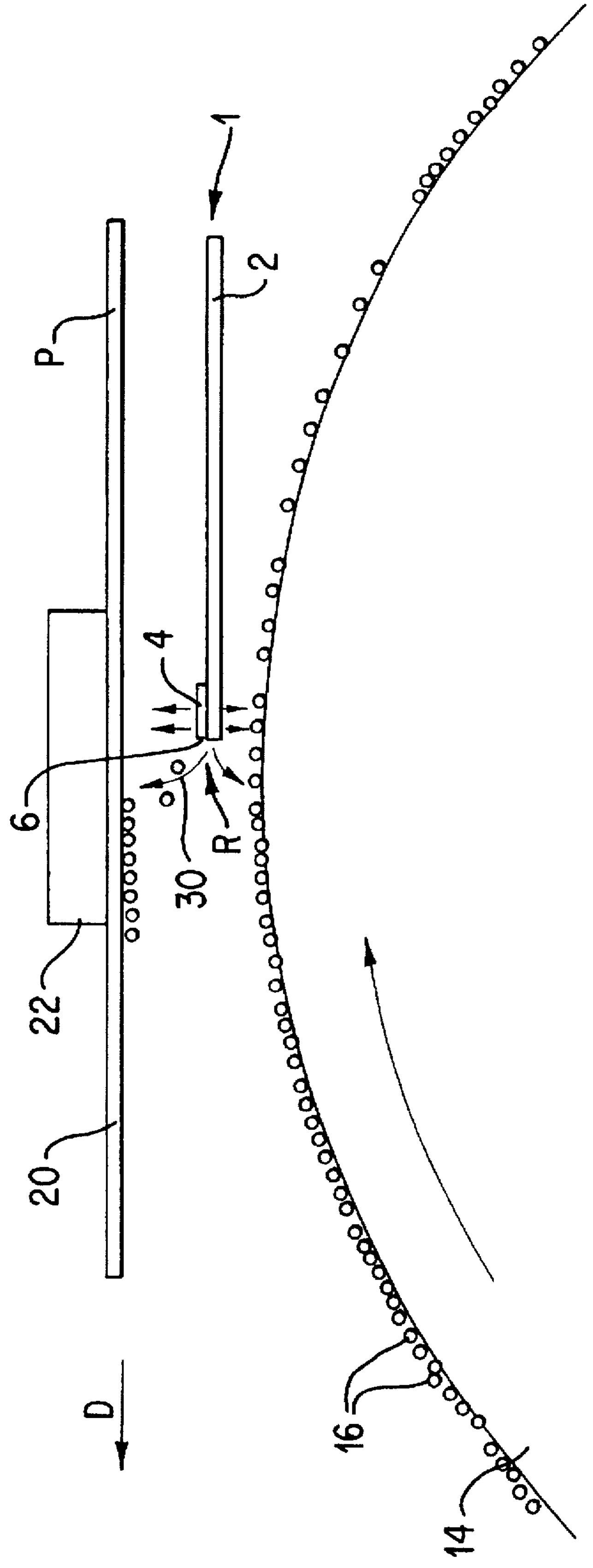
FIG. 5 is a diagrammatic view illustrating a direction of an electrostatic force of toner powder immediately after the voltage to be applied to a control electrode is changed from the on voltage to the off voltage.

When the on voltage of +20 V is applied to the control electrode 4, toner powder 16 is drawn out to the back electrode 22 past the recording edge portion 6. The toner powder drawn from the recording edge portion 6 to the back electrode 22 is attracted toward the back electrode 22 substantially along the electric lines of force Y1 or Z1 by an electrostatic force in the transporting direction D of the support member P. In this instance, some toner powder 16 is already accumulated on the support member P while some toner powder 16 is flying under the attracting force toward the back electrode 22. When the voltage applied to the control electrode 4 is changed from the on voltage of +20 V to the off voltage of −20 V, the toner powder 16 flying between the control electrode 4 and the support member P follows the advancement of the support member P as indicated by an arrow mark 30 in FIG. 5 until it is accumulated on the support member P. As a result, even if the voltage applied to the control electrodes 4 is changed from the on voltage to the off voltage, an image of high quality is formed free from trailing (i.e., clear-cut without remaining toner powder 16).

The support member P is fed by one picture element distance in the transporting direction D by the support member transport station 40 while a row of picture elements are formed on the face of the support member P from the toner powder 16. Then, a toner image is formed on the entire face of the support member P by repeating the above process. The toner image thus formed is fixed to the support member P by the fixing apparatus 26 and then discharged to the outside of the image forming apparatus through the discharging opening (not shown).

Figure 6:
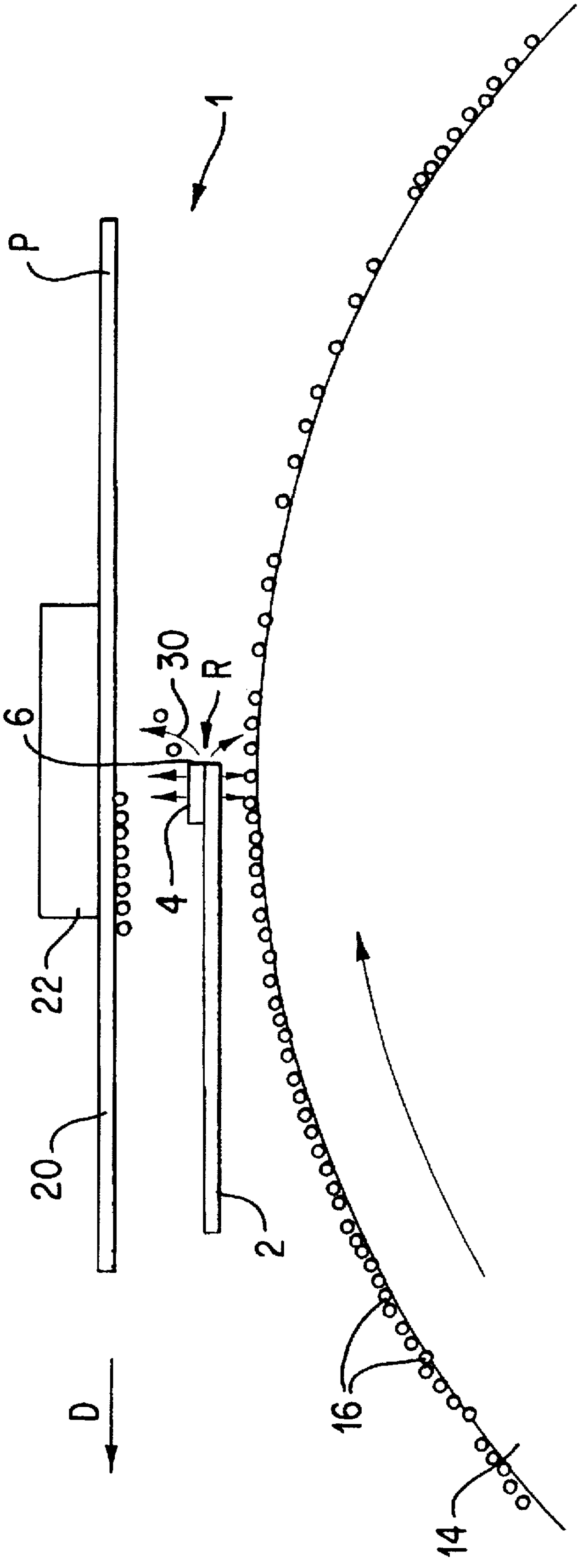
FIG. 6 is a diagrammatic view for comparison with FIG. 5 illustrating a direction of an electrostatic force of toner powder immediately after the voltage to be applied to the control electrode is changed from the on voltage to the off voltage.

When the recording edge portion 6 of the edge electrode member 1 is disposed on the downstream side of the recording medium R in the transporting direction D of the support member P as shown in FIG. 6, and the voltage applied to the control electrode 4 is changed from the on voltage of +20 V to the off voltage of −20 V, toner powder 16 between the control electrode 4 and the support member P flies in the opposite direction as the transporting direction until it accumulates on the support member P. As a result, even if the voltage applied to the control electrode 4 is changed over from the on voltage to the off voltage, an image trails on the support member P (i.e., an image having some remaining toner powder 16 is formed).

It is to be noted that the present invention is not limited to the embodiment described in detail above, but can be modified in various forms without departing from the spirit and scope of the invention as set forth in the appended claims. For example, the control electrodes 4 may alternatively be disposed on the other face of the insulating sheet 2 on the toner powder supply side. In this instance, the distance between the control electrodes 4 and the toner carrying roller 14 is reduced by an amount corresponding to the thickness of the insulating sheet 2. This arrangement is advantageous in that a controlling electric field of an equal intensity can be formed with a lower control voltage.

What is claimed is:

1. An image forming apparatus comprising:

an edge electrode member having a recording edge portion at an end portion thereof and disposed in proximity to a recording position at which a toner image can be formed on a support member, the edge electrode member controlling a flow of toner powder to the support member;

toner supply means for supplying charged toner powder toward said edge electrode member and said support member;

a back electrode disposed in an opposing relationship to said toner supply means with said edge electrode member positioned therebetween; and transport means for transporting the support member in a predetermined direction, wherein the edge electrode member includes an insulating sheet having a first side facing the toner supply means and a second side facing the back electrode, the edge electrode member further having a plurality of control electrodes provided on the second side of the insulating sheet such that the control electrodes do not overhang the second side of the insulating sheet.

2. The image forming apparatus of claim 1, wherein said toner supply means includes a toner carrying roller, the recording edge portion being disposed substantially in the proximity of a top portion of said toner carrying roller.

3. The image forming apparatus of claim 1, wherein the support member is transported by the transport means in a first direction, and wherein the recording edge portion is disposed in a second direction from the recording position, the second direction being an opposite direction from the first direction.

4. The image forming apparatus of claim 1, further comprising a control device to apply a voltage to the control electrodes, wherein the applied voltage is based on image data desired to be formed.

5. The image forming apparatus of claim 1, further comprising a holding member disposed between the support member and said edge electrode member for fixedly maintaining a gap between the support member and said edge electrode member.

6. The image forming apparatus of claim 5, further comprising a compression spring connected to said back electrode for maintaining a positional relationship between the support member and the edge electrode member.

7. The image forming apparatus of claim 1, wherein the back electrode and the recording edge portion of the edge electrode member create an electrostatic force in an advancing direction of the support member to control the flow of toner powder to the support member.

8. An image forming apparatus for forming an image on an image receiving member, the apparatus comprising:

a toner supply device for supplying charged toner to form the image on the image receiving member;

an edge electrode member having a recording edge device located at one end of said edge electrode member to control said toner being supplied to the image receiving member from the toner supply device; and an electrode device disposed on an opposite side of said edge electrode member from the toner supply device, the edge electrode member and the electrode device creating an electrostatic force in an advancing direction of the image receiving member, wherein the edge electrode member includes an insulating sheet having a first side facing the toner supply device and a second side facing an opposite direction than the first direction, the edge electrode member further having a plurality of control electrodes provided on the second side of the insulating sheet such that the control electrodes do not overhang the second side of the insulating sheet.

9. The image forming apparatus of claim 8, wherein the plurality of control electrodes are selectively controlled based on image data.

10. The image forming apparatus of claim 9, further comprising a control voltage applying circuit that selectively applies voltages to said control electrodes based on the image data.

11. The image forming apparatus of claim 10, wherein the control voltage applying circuit applies voltage of one polarity to said control electrodes corresponding to image portions and said control voltage applying circuit applies voltage of an opposite polarity to said control electrodes corresponding to non-image portions.

12. An image forming apparatus for forming a toned image on a support member, the apparatus comprising:

an edge electrode member having a recording edge portion with a plurality of control electrodes disposed in proximity to a recording position;

a toner roller supplying toner particles toward said edge electrode member; and a back electrode positioned on an opposite side of said edge electrode member as said toner roller, the back electrode, control electrodes and toner roller controlling toner particles flowing toward said support member, wherein the edge electrode member includes an insulating sheet having a first side facing the toner roller and a second side facing the back electrode, the edge electrode member further having the control electrodes provided on the second side of the insulating sheet such that the control electrodes do not overhang the second side of the insulating sheet.

* * * * *